United States Patent
Zeh et al.

(10) Patent No.: US 12,549,338 B2
(45) Date of Patent: Feb. 10, 2026

(54) ASYMMETRICAL MULTI-CHANNEL COMMUNICATION SECURITY

(71) Applicant: Infineon Technologies AG, Neubiberg (DE)

(72) Inventors: Alexander Zeh, Munich (DE); Thomas Liebetrau, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 88 days.

(21) Appl. No.: 18/660,740

(22) Filed: May 10, 2024

(65) Prior Publication Data
US 2025/0350447 A1    Nov. 13, 2025

(51) Int. Cl.
*H04L 9/08*    (2006.01)
*H04L 9/40*    (2022.01)

(52) U.S. Cl.
CPC ............ *H04L 9/0838* (2013.01); *H04L 63/08* (2013.01)

(58) Field of Classification Search
CPC .............................. H04L 9/0838; H04L 63/08
See application file for complete search history.

(56) References Cited

U.S. PATENT DOCUMENTS

| 2018/0060608 A1* | 3/2018 | Holden | G06Q 20/38215 |
| 2021/0119968 A1* | 4/2021 | Schibuk | H04L 63/0236 |

OTHER PUBLICATIONS

Hogenmueller, T., et al.: Improved Support of Asymmetric Applications for MGbps Ethernet Cameras (ISAAC), https://www.ieee802.org/3/ad_hoc/ngrates/public/calls/23_0628/matheus_dalmia_zimmerman_3NEA_01_06282023.pdf; Jul. 2023.
https://electronics.stackexchange.com/questions/465856/ethernet vs can bus physical signal; Nov. 2020.

* cited by examiner

*Primary Examiner* — Benjamin A Kaplan
(74) *Attorney, Agent, or Firm* — Banner & Witcoff, Ltd.

(57) ABSTRACT

The described techniques address issues related to secured communications via asymmetrical data communications, e.g. when one of the secured channels has a higher-bandwidth than the other secured channel. The techniques facilitate the detection of an impending expiration of a cryptographic key used for secured communications prior to its actual expiration and, in response, updating the cryptographic key for that secured channel. The updated cryptographic key for one secured channel may then be transmitted via the other secured channel as part of secured (e.g. encrypted) data communications. The techniques also allow for the use of different cryptographic algorithms per secured channel, different key lengths for the cryptographic keys, and/or different software or hardware solutions to be implemented per secured channel.

24 Claims, 4 Drawing Sheets

ASYMMETRICAL MULTI-CHANNEL COMMUNICATION SECURITY

TECHNICAL FIELD

The disclosure generally relates to the use of secure data communications and, more particularly, to managing the renewal and synchronization of cryptographic data for asymmetrical data communications via separate secured channels having different bandwidths by using one of the secured channels to exchange the updated cryptographic data for the other secured channel.

BACKGROUND

Many networked systems, such as in-vehicle networks, implement a system of secured channels to ensure secured communication between various interconnected components. Moreover, specific types of components, such as in-vehicle cameras for example, require high speed connectivity that is typically addressed via the use of Ethernet. For example, when software processing is removed from a camera (satellite architecture), higher asymmetric data rates need to be transmitted. Conventional layer 2 security (e.g. Media Access Control Security (MACsec)) protocols may be implemented for symmetrical communication scenarios, but are not cost optimized for asymmetrical communication use cases. Further complicating this issue, many components requiring high data connectivity are also sensitive to power consumption and design costs. As a result, conventional solutions to address secure and high speed asymmetric data connectivity between interconnected network devices have been inadequate.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The example aspects of the present disclosure will be described with reference to the accompanying drawings. The drawing in which an element first appears is typically indicated by the leftmost digit(s) in the corresponding reference number.

SUMMARY

As discussed in further detail herein, the underlying network supporting a system of interconnected devices may be implemented as part of any suitable type of system that utilizes secured communications such as, for example, an in-vehicle network, industrial-based networks such as those used in production lines, etc. For example, a system of interconnected devices may include a centralized or primary device such as a central computer, an electronic control unit (ECU), a microcontroller etc. This centralized device may communicate with several other interconnected devices, which may be referred to as remote devices, such as camera modules, display modules, radar modules, sensors, etc.

Such interconnected networks need to offer secure and high speed connectivity, which has conventionally been addressed using symmetrical data communications. However, the data communications in such networks is often asymmetrical. Proposed solutions for addressing secure asymmetrical data communications are directed primarily to the physical (PHY) layer, which provides the electrical, mechanical, and procedural interface for a particular transmission medium. To date, no solutions have been considered with respect to the security or protocols needed for interoperability with such interfaces to provide secure and high speed asymmetrical data communications.

The embodiments as discussed in further detail herein recognize that the asymmetric nature of communications between devices is a result of the need to transmit different types of data, and thus different types of data may be communicated via physically separated secured channels. Each secured channel may represent a bidirectional or a unidirectional channel. For example, control data such as configuration data and diagnosis-related data may be transmitted less frequently than other types of data, and is more likely to be communicated bi-directionally between devices. However, other types of data, such as a video stream, a radar stream, a sensor data stream, etc., may be transmitted more frequently (requiring a higher bandwidth), and is more likely to be communicated unidirectionally between devices.

The embodiments described herein exploit the nature of such asymmetrical communications to assign different types of data communications to different physically separated secured channels. In doing so, each secured channel may utilize a different security protocol layer. For instance, bidirectional data communications may be implemented via a higher layer security protocol such as Internet Protocol Security (IPsec) security protocol (e.g. in software), whereas unidirectional data communications may be implemented via a lower layer security protocol such as the MACsec security protocol (e.g. in hardware).

The specific type of security protocols that may be used are provided by way of example and not limitation, and the secured channels as discussed herein may be implemented using any suitable type of security protocol. However, regardless of the type of security protocol that is used, each secured channel may utilize cryptographic data to perform secured communications, which may include one or more cryptographic keys and index values (e.g. freshness values). The cryptographic keys may include a shared key such as a primary cryptographic key that may be implemented in accordance with any suitable cryptographic function or any other suitable type of cryptographic key that is implemented for secured communications. Theses secured communication between devices may include Authenticated Encryption with Associated Data (AEAD) communications as well as authentication only communications.

To ensure robust security measures are maintained, some cryptographic keys may "expire" after a number of secured message transmissions. Given that one of the secured channels (e.g. the higher bandwidth channel) operates faster than the other secured channel, the cryptographic key(s) for the higher-bandwidth channel will expire first. The embodiments described herein enable the detection of an impending expiration of a cryptographic key prior to its actual expiration and, in response, update the cryptographic key as well as other data used for secured communications, such as the index value for that secured channel. The updated cryptographic key and the updated index value for one secured channel may then be transmitted via the other secured channel as part of secured data communications. In this way, the updated shared key and the updated freshness value are not transmitted "in the clear," which would represent a security issue.

Additionally, the embodiments described herein may implement different types of cryptographic algorithms per secured channel, different key lengths for the cryptographic keys used per secured channel, and/or may implement software or hardware solutions per each secured channel. For example, a lower bandwidth secured channel may implement a longer length cryptographic key compared to the higher bandwidth secured channel, and each may be used in accordance with the same cryptographic algorithm or a different cryptographic algorithm. Additionally, a hardware solution may be implemented for the higher bandwidth secured channel, whereas a software solution may be implemented for the lower bandwidth secured channel. Thus, the use of physically separate secured channels not only facilitates better resistance to hardware attacks, but also provides flexibility regarding the implementation of the overall system.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 1:
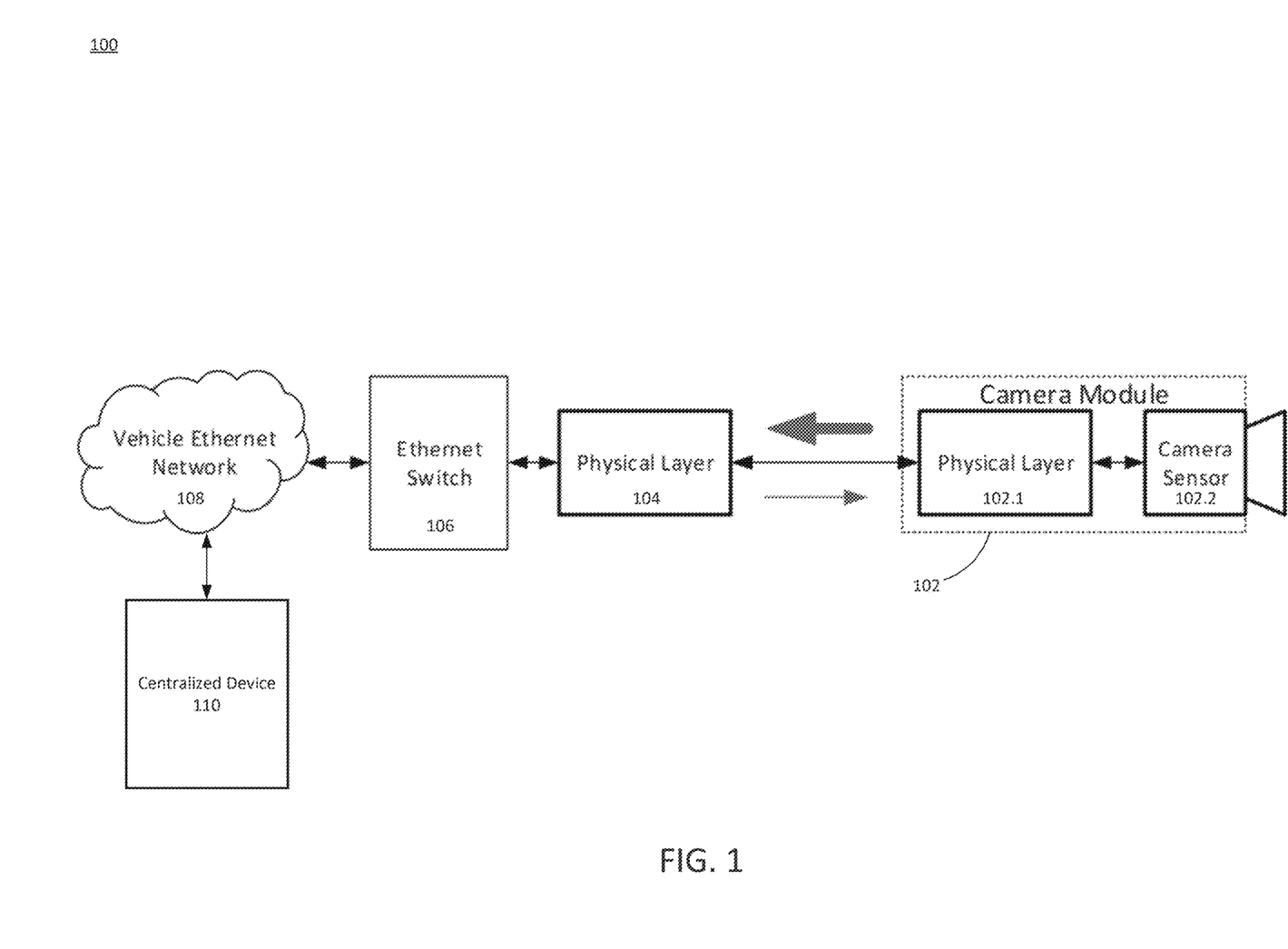
FIG. 1 illustrates the use of a conventional asymmetrical communication system.

FIG. 1 illustrates the use of a conventional asymmetrical communication system. The conventional asymmetrical communication system 100 as shown in FIG. 1. The communication system 100 as shown in FIG. 1 is part of an in-vehicle network, and includes a remote device, which is a camera module 102 in this example, communicating with a centralized device 110. To do so, the camera module 102 includes a single physical layer 102.1 and a camera sensor 102.2. The physical layer 102.1 is configured to interface with another single physical layer 104 that is part of the in-vehicle network. The physical layer 102.1 transmits sensor data captured via the camera sensor 102.2 (e.g. a video data stream), which is received by the centralized device 110 via the physical layer 104, the Ethernet switch 106, and the vehicle Ethernet network 108. The centralized device 110 also transmits control data to the camera module 102 (e.g. configuration data), which is received by the camera module 102 via the vehicle Ethernet network 108, the Ethernet switch 106, and the physical layer 104. The camera module may also transmit control data (e.g. diagnostic data) to the centralized device 110.

The data communications between the centralized device 110 and the camera module 102 are asymmetric in that the camera module 102 transmits more data than is received, and the centralized device 110 receives more data than it transmits. As noted above, current Ethernet-based security protocols are not well-suited for such asymmetrical communication systems. Moreover, all data is typically transmitted over a single physical channel and using single physical layers 103.1, 104, limiting the design of the physical layers 102.1, 104. The embodiments as discussed in further detail herein address these issues via the use of separate physical secured channels as well as the management of cryptographic data by leveraging one channel to update cryptographic data used by the other secured channel.

Figure 2A:
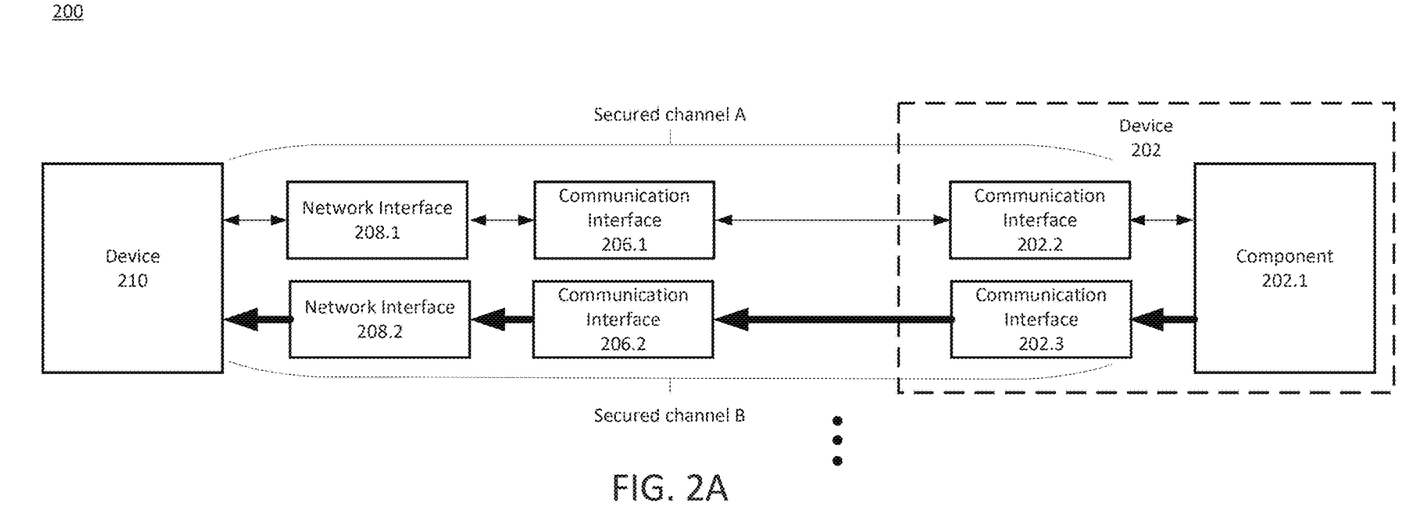
FIGS. 2A and 2B illustrate example communications using separate secured channels, in accordance with one or more embodiments of the disclosure.
Figure 2B:
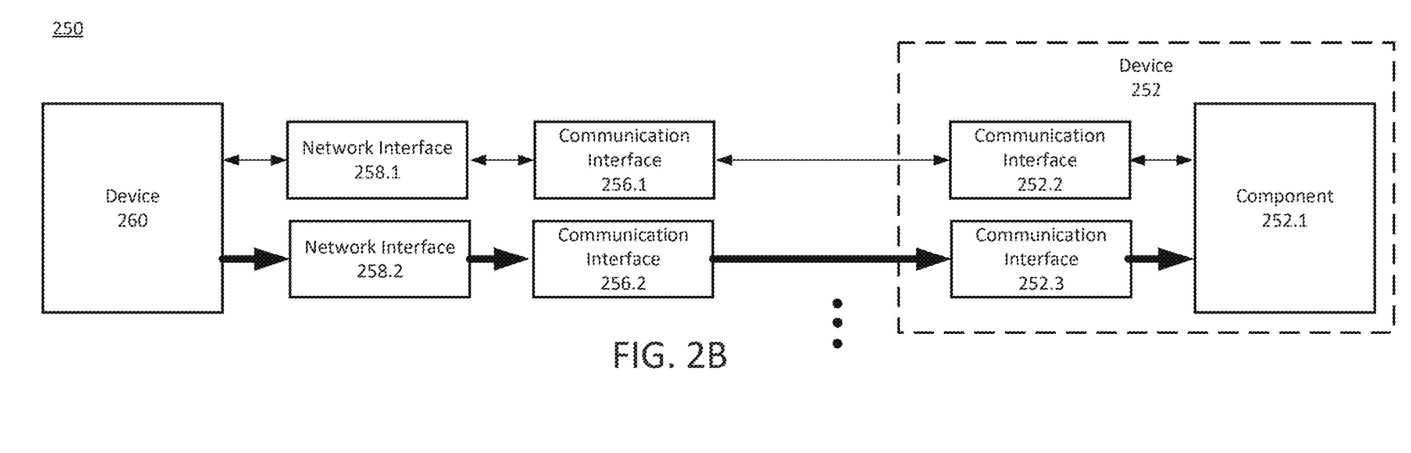

FIGS. 2A and 2B illustrate example communications using separate secured channels, in accordance with one or more embodiments of the disclosure. The communication system 200 as shown in FIG. 2A comprises two devices 202, 210. The arrows between each of the components as shown in FIGS. 2A and 2B may represent any suitable number and/or type of communication links that may facilitate the transfer of data in accordance with any suitable number and/or type of communication protocols. For instance, these communication links may comprise wired and/or wireless links, buses, wires, cables, conductive traces, optical connections, etc.

The device 202 may be implemented as any suitable type of remote device, which may be implemented in accordance with any suitable application to perform bidirectional and/or unidirectional communications with the device 210. For example, the device 202 may be identified with any suitable type of device or sensor module, such as a camera module or a radar module, which may be implemented as a remote device that communicates with a network, such as an in-vehicle network, for example, as described above.

The device 202 includes a component 202.1, which is communicatively coupled to two separate communication interfaces 202.2, 202.3, with each of the separate communication interfaces 202.2, 202.3 being identified with a separate physical secured channel A, B as shown in FIG. 2A. The component 202.1 may comprise any suitable component of the device 202 that is configured to transmit and receive data via the secured channels A, B. For example, when the device 202 is implemented as a camera module, the component 202.1 may be implemented as a camera sensor. As another example, when the device 202 is implemented as a radar module, the component 202.1 may be implemented as a radar sensor.

The communication interfaces 202.2, 202.3 may be implemented as any suitable type of data interfaces configured to facilitate the transmission and/or reception of data in accordance with any suitable respective protocols. The communication interfaces 202.2, 202.3 may be configured to support the same communication protocols or different communication protocols. In an embodiment, each of the communication interfaces 202.2, 202.3 may represent the physical layer and the accompanying data interfaces used in accordance with any suitable communication protocol and/or standard, such as Ethernet for example.

The secured channel A is shown in FIG. 2A as supporting bidirectional communications between the devices 202, 210, whereas the secured channel B is configured to support unidirectional communications transmitted from the device 202 to the device 210. This is by way of example and not limitation, and the secured channels A, B may alternatively comprise two bidirectional channels. However, the use of a bidirectional and unidirectional channel may be particularly useful to support the communications of different types of data between the devices 202, 210. For example, the bidirectional secured channel A may be used to communicate control data between the devices 202, 210 such as configuration and/or diagnostic data, whereas the unidirectional secured channel B may be used to transmit a stream of sensor data such as a video data stream, a radar data stream, etc. In such a scenario, it is also noted that the unidirectional secured channel B may be configured to support a higher bandwidth and/or speed of data communications versus the bidirectional secured channel A. This is because the nature of the data communications, such as video or radar data streams, for instance, typically require a higher bandwidth due to the higher occurrence of data transmissions, as noted above. In any event, it is also noted that the assignment of these specific data types to the bidirectional and unidirectional secured channels is likewise by way of example and not limitation, and the secured channels A, B may be implemented as bidirectional or unidirectional channels and support the communication of any suitable type of data between the devices 202, 210.

The device 210 may be implemented as any suitable device that is coupled to the same network as the device 202. The device 210 may thus be implemented as any suitable type of device based upon the particular application of the communication system 200. For instance, the device 210 may be implemented as a centralized computing device within a vehicle that utilizes an in-vehicle network. This may include, for example, an electronic control unit or other suitable computing device. As another example, the device 210 may be implemented as a zone controller that transmits and receives data to the device 202 as part of zoned communications, which may be secured zones in accordance with any suitable communication protocol.

Regardless of its particular implementation, the device 210 is configured to communicate with the device 202 using secured communications over two separate secured channels A, B, as noted above. Of course, the communication system 200 may include any suitable number of additional channels, although two secured channels are used herein for brevity and ease of explanation. The communication system 200 includes, for each secured channel A, B, a communication interface 206.1, 206.2 and a network interface 208.1, 208.2.

The communication interfaces 206.1, 206.2 may be configured identical or similar to the communication interfaces 202.2, 202.3 of the device 202, as described above. For example, the communication interfaces 206.1, 206.2 may be implemented as any suitable type of data interfaces configured to facilitate the transmission and/or reception of data in accordance with any suitable respective protocols. The communication interfaces 206.1, 206.2 may be configured to support the same communication protocols or different protocols, although the communication protocol implemented by the communication interfaces 202.2, 206.1 may be the same as one another, and the communication protocol implemented by the communication interfaces 202.3, 206.2 may likewise be the same as one another. In an embodiment, each of the communication interfaces 206.1, 206.2 may represent the physical layer and accompanying data interfaces used in accordance with any suitable communication protocol and/or standard, such as Ethernet for example.

The network interfaces 208.1, 208.2 may be implemented as any suitable device configured to facilitate the communication interfaces 206.1, 206.2 and the devices 202, 210 connecting and interfacing with any suitable type of communication network. Thus, the arrows between the device 210 and the network interfaces 208.1, 208.2 may comprise a communication network, such as an in-vehicle network for example, to which the device 210 is connected. As an example, the network interfaces 208.1, 208.2 may be implemented as any suitable type of components configured to facilitate such network connections, such as network switches (e.g. Ethernet switches), multiplexers, a medium access control (MAC) layer that controls the hardware responsible for interaction with the network, etc.

Thus, in an embodiment, the secured channel A and the secured channel B are physically separated from one another between the device 202 and the device 210. For instance, the secured channel A may comprise the communication interface 202.2, the communication interface 206.1, the network interface 208.1, the communication links between these components, or any subset of these components. Likewise, the secured channel B may comprise the communication interface 202.3, the communication interface 206.2, the network interface 208.2, the communication links between these components, or any subset of these components. By using separate and dedicated secured channels in this manner, the security of the communication system 200 is enhanced compared to traditional communication systems that share a common channel for the communication of all data, such as that shown in FIG. 1.

FIG. 2B illustrates a communication system 250, which includes components that may be implemented in an identical or similar manner as their analogous components as shown in FIG. 2A. Any of the statements made above with respect to the communication system 200 of FIG. 2A are likewise applicable to the communication system 250 as shown in FIG. 2B. However, the direction of the unidirectional secured channel B in FIGS. 2A and 2B are opposite to one another. This demonstrates that the communication systems 200, 250 may be implemented using a unidirectional secured channel that enables the flow of data from the device 202 to the device 210 (as shown in FIG. 2A), or in the opposite direction from the device 210 to the device 202 (as shown in FIG. 2B). The scenario as shown in FIG. 2B may be implemented, for instance, when the unidirectional data communicated via the secured channel B from the device 210 to the device 202 utilizes a higher bandwidth than the bidirectional secured channel B. This may be the case, for example, when the device 202 is implemented as a display, requiring streaming data to be transmitted by the device 210.

Figure 3:
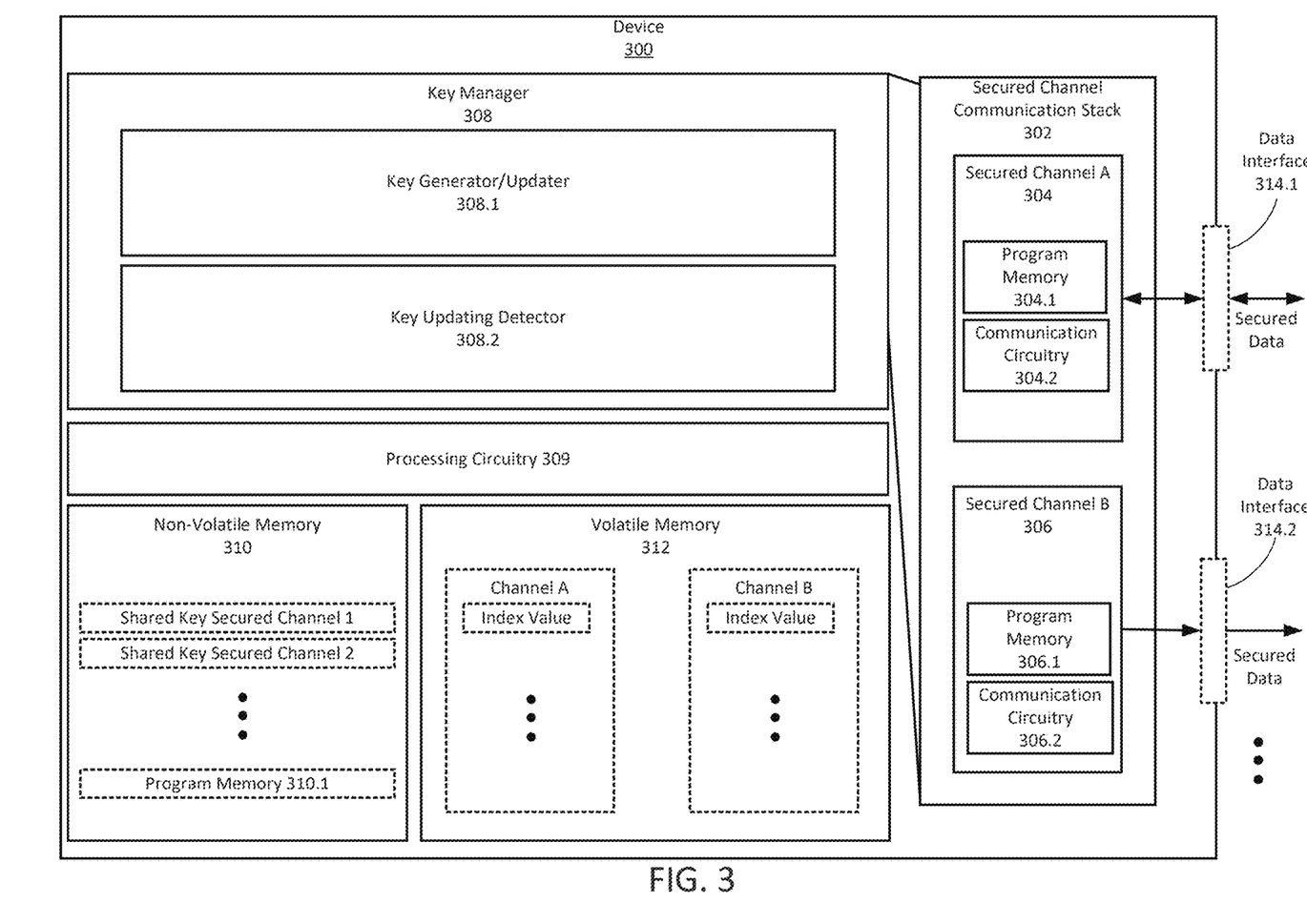
FIG. 3 illustrates an example device architecture, in accordance with one or more embodiments of the disclosure.

Turning now to FIG. 3, an example device architecture is shown in accordance with one or more embodiments of the disclosure. Because the devices 202, 260 may transmit via the unidirectional secured channel B as noted above, the device 300 as shown in FIG. 3 may be identified with either of the devices 202, 260. For instance, the device 300 may be identified with the device 260 as shown in FIG. 2B or the device 202 as shown in FIG. 2A, as each device performs unidirectional data transmissions via the secured channel B. However, this is provided by way of example and not limitation, and the secured channel B may alternatively receive data instead of transmitting data (not shown). In this scenario, the device 300 as shown in FIG. 3 may be identified with either of the devices 210, 252. When implemented as part of either device 202, 210, 252, 260, the device 300 may be identified, for example, with a microcontroller host or other suitable hardware platform that is configured to perform the various functions as discussed in further detail herein. As will be further discussed below, the device 300 may implement software, hardware components, or combinations of these to implement the various functions as discussed herein.

The device 300 may comprise any suitable number and/or type of components, with an example of such components being shown in FIG. 3 by way of example and not limitation. For instance, the device 300 includes a secured channel communication stack 302, which in turn comprises secured channel circuitry 304 (for the secured channel A) and secured channel circuitry 306 (for the secured channel B). Although referred to herein as "circuitry," the secured channel circuitry 304, 306 may handle communications via their respective channels using software, hardware, or combinations of these. To do so, each of the secured channel circuitry 304, 306 comprises program memory 304.1, 306.1 and communication circuitry 306.1, 306.2. Although shown in FIG. 3 as separate components, the secured channel communication stack 302 may comprise a single program memory and/or communication circuity that is configured to perform the various functions with respect to the secured channel circuitry 304 and/or the secured channel circuitry 306.

Each of the secured channel circuitry 304 and the secured channel circuitry 306 may be configured to perform respective secured communications with another device, such as the device 210 or 252, for example, as shown in FIGS. 2A and 2B. Each of the secured channel circuitry 304 and the secured channel circuitry 306 may perform their respective secured communications by transmitting, receiving, encrypting, decrypting, processing, authenticating, etc., secured messages that are transmitted or received via each respective secured channel A, B. These various processes may be performed in accordance with any suitable number and/or type of secure communication protocols, such as those discussed herein. To so do, the device 300 may comprise data interfaces 314.1, 314.2, each being implemented for each respective secured channel A, B. Each of the data interfaces 314.1, 314.2 may comprise any suitable implementation of components for this purpose, such as for instance wires, buses, buffers, drivers, and/or respective terminals, ports, pins, etc.

The communication circuitry 304.2, 306.2 may be implemented as any suitable hardware components that enable communications between the device 300 and another device within an interconnected network, as further discussed herein, via the data interfaces 314.1, 314.2. Thus, the communication circuitry 304.2 may perform secured bidirectional communications by transmitting secured data (e.g. secured messages) to the data interface 314.1 and receiving secured data (e.g. secured messages) from the data interface 314.1 in accordance with any suitable number and/or type of communication protocols, such as those discussed herein. Additionally, and for the non-limiting scenario as shown in FIG. 3, the communication circuitry 306.2 may perform secured unidirectional communications by transmitting secured data to the data interface 314.2 in accordance with any suitable number and/or type of communication protocols, such as those discussed herein.

To do so, the communication circuitry 304.2, 306.2 may comprise hardware components, software components, or combinations of these, which are typically associated with components configured to perform data communications. For example, the communication circuitry 304.2, 306.2 may comprise any suitable number of ports, drivers, transmit and/or receive buffers, switches, etc. Additionally or alternatively, the communication circuitry 304.2, 306.2 may comprise any suitable number and/or type of dedicated hardware components such as a microcontroller, an application specific integrated circuit (ASIC), a field programmable gate array (FPGA), a system on a chip (SoC), dedicated logic and/or other circuitry, a multi-processing unit (MPU), an application processing unit (APU), a hardware-based state machine, etc. The communication circuitry 304.2, 306.2 may be implemented as one or more processors and/or cores, which may execute computer-readable instructions stored in the program memories 304.1, 306.1 to perform any of the various functions as discussed in further detail herein.

The program memories 304.1, 306.1 may comprise any suitable type of non-transitory computer readable medium such as volatile memory, non-volatile memory, or combinations of these. Thus, to the extent that either of the secured channel circuitry 304, 306 implements software-based solutions to perform the various functions as discussed herein, this may be achieved, for instance, via the communication circuitry 304.2, 306.2 executing instructions stored in the program memory 304.1, 306.1, respectively, as the case may be. To the extent that either of the secured channel circuitry 304, 306 implements hardware-based solutions to perform the various functions as discussed herein, this may be achieved, for instance, via the communication circuitry 304.2, 306.2 implementing predetermined logic, an ASIC, a hardware accelerator, etc., as the case met be.

Again, the secured channel A and the second secured channel B may be configured to operate at different bandwidths and/or speeds, as the secured bidirectional data communications performed via the secured channel A may transfer a different type of data than the secured unidirectional data communications performed via the secured channel B. For instance, the unidirectional communications performed via the secured channel B may be performed using a higher bandwidth and/or higher speed compared to the bidirectional communications using the secured channel A, as noted above. Thus, it may be particularly useful for the secured channel circuitry 306 to perform the unidirectional communications using hardware components, whereas the secured channel circuitry 304 may perform the bidirectional communications using software (e.g. via the execution of computer-readable instructions stored in the program memory 304.1 via the communication circuitry 304.2). The use of software and hardware for each of these type of communications is further discussed below.

Again, the secured communications performed via the secured channel circuitry 304, 306 may be in accordance with any suitable number and/or type of communication protocols and accompanying schemes (e.g. modes of operation). For instance, the secured communications transmitted and/or received via the secured channel circuitry 304, 306 may be performed in accordance with communication protocols that utilize the authenticated-encryption Galois/Counter Mode (AES-GCM)-SIV of operation, the Counter with CBC-MAC Modes (CCM) of operation, communication protocols that utilize modes of operation implementing the ShangMi 4 (SM4) cipher, any suitable type of Ethernet communication protocols (e.g. multi-drop Ethernet communication protocols such as 10BASE-TIS, 10BASE-TIL, the Ethernet MACsec standard, etc.), any suitable in-vehicle network protocols such as a Controller Area Network (CAN) communication protocol, Controller Area Network Flexible Data-Rate (CAN FD) communication protocol, a Controller Area Network Extra Long (CAN XL) communication protocol, any suitable communication protocols that implement Authenticated Encryption with Associated Data (AEAD) schemes and/or an authentication only scheme, etc.

Many of the aforementioned protocols utilize shared keys for secured communications, as discussed above. Thus, to perform secured communications, the device 300 comprises a key manager 308, processing circuitry 309, a non-volatile memory 310, and a volatile memory 312. These components are illustrated in FIG. 3 as being separate entities, with their corresponding functions being described separately for ease of explanation. However, any of the components of the device 300 may be integrated or otherwise combined with one another. The device 300 may also comprise additional or alternative components as those shown and discussed herein with respect to FIG. 3. Furthermore, although the device 300 is shown and described herein with respect to the use of the non-volatile memory 310 and the volatile memory 312, this is by way of example and not limitation. Any of the data stored in the non-volatile memory 310 and the volatile memory 312 may be additionally or alternatively stored in other memories, which may be part of the device 300 or components external to the device 300. For example, any of the data that is illustrated in the Figures as being stored in a volatile memory 312 may alternatively be stored in a non-volatile memory 310, and vice-versa. However, it is recognized that specific types of data, such as the shared keys, may advantageously be stored in non-volatile memory to ensure their security.

The processing circuitry 309 may comprise any suitable number and/or type of dedicated hardware components such as those mentioned above with respect to the communication circuitry 304.2, 306.2. For instance, the processing circuitry 309 may be implemented as any suitable number and/or type of dedicated hardware components such as a microcontroller, an application specific integrated circuit (ASIC), a field programmable gate array (FPGA), a system on a chip (SoC), dedicated logic and/or other circuitry, a multi-processing unit (MPU), an application processing unit (APU), a hardware-based state machine, etc. The processing circuitry 309 may be implemented as one or more processors and/or cores, which may execute computer-readable instructions stored in the program memory 310.1 to perform any of the various functions as discussed in further detail herein. The processing circuitry 309 and program memory 310.1 are illustrated in FIG. 3 separately from the key manager 308 and the secured channel communication stack 302. However, this is for ease of explanation, and it is understood that the processing circuitry 309 may facilitate any of the operations of the key manager 308 and/or the secured channel circuitries 304, 306 as further discussed herein, and thus the key manager 308, the communication circuitry 304.2, 306.2, and the processing circuitry 309 may, in some embodiments, comprise a single component. Additionally or alternatively, the program memories 304.1, 306.1, and 310.1 may be identified with the same memory and/or instruction set.

In an embodiment, the key manager 308 may form part of and/or be integrated with the communication stack 302. As further discussed herein, the key manager 308 may facilitate the generation and updating of cryptographic keys (e.g. shared keys or other cryptographic keys, as discussed in further detail herein) as well as index values, each being stored in the non-volatile memory 310 and volatile memory 312 as shown in FIG. 3. The key manager 308 may thus be configured to operate as part of a control plane that is identified with the communication network the device 300 uses for secured communications with other devices. Continuing this example, the secured channel circuitry 304, 306 may be configured to operate as part of the data plane that is identified with the communication network the device 300 uses for secured communications with other devices.

As is generally known, for secured communication protocols, the control plane functionality is distinguished from the data plane functionality. For example, the control plane makes decisions regarding how data should be managed, routed, and processed. The control plane acts as a supervisor of data, coordinating communications between different components and collecting data from the data plane. Thus, the control plane may be configured to operate in accordance with any suitable communication protocols such as routing protocols, network management protocols, application layer protocols, etc., which are implemented based upon the particular network. For ease of explanation the key manager 308 may be configured to perform at least part of these control plane functions, as noted above. Additionally, the data plane is responsible for the actual movement of data from one system to another. These secured communications may include transmitting and receiving secured messages as part of Authenticated Encryption with Associated Data (AEAD) data streams or authentication only data streams, as noted herein.

The control plane functionality is therefore crucial from the security point of view, with significant effort being expended to certify the control plane functionality in secured networks (e.g. SAE-ISO 21434/NIST/BSI compliance, etc.). The design of the data plane typically presents challenges with respect to data throughput. With the functions of the control plane and the data plane in mind, it is noted that the asymmetric data communications described herein advantageously allow for only one of the secured channels A, B to be identified with the control plane. Considering that the bidirectional secured channel A has a lower operating bandwidth and a lower speed than the unidirectional secured channel B, it may be particularly advantageous to configure the control plane for only one of the channels, e.g. only the bidirectional secured channel A. In doing so, additional effort that would otherwise be required for certifying the control plane for both secured channels A, B may be avoided. This may be the case, for instance, for in-vehicle networks that already implement an electrical/electronic (E/E) security architecture with one or more dedicated low-speed (but secured) channels. In this case, applying the embodiments as discussed herein allow for the control plane to be removed from the high-speed secured channel. Doing so eliminates the need for certification and compliance costs that would otherwise be necessary when using a control plane for all secured channels in the E/E architecture.

The key manager 308 may comprise a key generator/updater 308.1 and a key updating detector 308.2. The key manager 308, as well as the components thereof, may be implemented as hardware, software, or combinations of these to perform the various functions as discussed herein. For instance, any of the various functions as discussed herein with respect to the device 300 may be performed via the processing circuitry 309 executing instructions stored in the non-volatile memory 310. These functions are described herein with respect to the key generator/updater 308.1 and the key updating detector 308.2 for ease of explanation, although it is understood that these functions may alternatively be implemented via any suitable hardware components and/or via a single program stored in any suitable memory accessible via the device 300.

The key generator/updater 308.1 may implement any suitable type of cryptographic function to generate one or more cryptographic keys, each representing a bit string or other suitable encoded numeric value having any suitable length. The key generator/updater 308.1 may be configured to generate and/or update any suitable type of cryptographic keys that are used to perform secured communications for each of the secured channels A, B. For example, the key generator/updater 308.1 may be configured to generate and update the shared keys per secured channel, such as those shown in FIG. 3 that are stored in the non-volatile memory 310. The key generator/updater 308.1 may implement any suitable cryptographic function, algorithm, or known techniques to update the shared keys in this manner.

Additionally or alternatively, the key generator/updater 308.1 may be configured to generate and update any suitable number of other cryptographic keys using the shared key per secured channel. In such a scenario, the key generator/updater 308.1 may retain the shared keys stored in the non-volatile memory 310 (i.e. not update the shared keys) while updating other cryptographic keys that are used for secured communications. These other cryptographic keys may comprise session keys, for example, which are derived from each respective shared key in accordance with a key derivation function (KDF), which represents a specific cryptographic function in accordance with the particular communication protocol that is implemented. The session keys may thus be updated by modifying an input to the KDF in addition to the shared keys. The session keys may be stored in any suitable memory or otherwise accessible by the device 300, and are not shown in the Figures for purposes of brevity. Moreover, the use of KDFs are generally known, and thus additional detail regarding KDF operation is not described herein for purposes of brevity.

In any event, the device 300 and the other device that are communicating over a secured channel may store (in a local memory such as the non-volatile memory 310 and the volatile memory 312) a synchronized copy of the cryptographic keys (e.g. the shared keys) and a synchronized copy of the index values. The index value may comprise any suitable encoded value that is updated each time a secured message is transmitted or received to prevent replay attacks. For instance, the index value may comprise a packet number, a sequence number, a freshness value, etc. The cryptographic keys as well as the index values may collectively be referred to herein as "cryptographic data."

Thus, to perform secured data transmissions over a particular secured channel, the secured channel circuitry 304, 306, as the case may be, may utilize the stored shared key and the stored shared index value for that secured channel. The security of the authentication and/or encryption of the secured messages sent over a secured channel is dependent upon the stored shared key, although it is noted that additional cryptographic keys and/or other cryptographic data may be derived from the shared key to ensure secured communications. Upon receiving the secured message, the receiving device may authenticate the message using its own shared key and shared index value (e.g. when authentication only schemes are used). Additionally or alternatively, the receiving device may utilize its own shared key and shared index value to authenticate and decrypt the payload of a secured message (e.g. when authentication encryption with associated data (AEAD) encryption schemes are used).

Thus, to guard against replay attacks, the index values are incremented by each transmitting device upon transmitting a secured message via the secured channels A, B, as well as by each receiving device when receiving a secured message via the secured channels A, B. This may be implemented, for example, via the key generator/updater 308.1 as part of the control plane operations as noted above. The stored shared index values are thus indexed, e.g. incremented, per secured channel in a predefined manner as secured messages are transmitted and received via each secured channel A, B. Each device that communicates in this manner (e.g. the devices 202, 210 or the devices 252, 260) then updates its locally-stored volatile memory 312 such that the most recent index value is stored, which will again be updated for the next transmitted or received message.

For example, the key generator/updater 308.1 is configured to update the index value for channel A that is stored in the volatile memory 312 in response to data being transmitted or received via the secured channel A. Furthermore, the key generator/updater 308.1 is configured to update the index value for channel B that is stored in the volatile memory 312 in response to data being transmitted via the secured channel B. Of course, key generator/updater 308.1 may also update the index value for channel B that is stored in the volatile memory 312 in response to data that is received via the secured channel B for scenarios in which the device 300 receives data on the secured channel B instead of transmitting data, as shown in FIG. 3. The index values may be updated in accordance with any suitable techniques, including known techniques. For instance, the index values may be incremented by any suitable predetermined number, incremented per packet, etc. It is also noted that although the index value is updated in this manner, the volatile memory 312 may store any suitable number of index values at any time. This allows a log of index values to be maintained, with slightly older index values being used when secured messages are received out of order based upon a secured message and index value correlation process.

Regardless of how the index values are updated, embodiments include the two devices communicating over a secured channel A, B using the cryptographic key and the current index values to perform the secured communications for that channel. Again, the index value may represent a freshness value. In this scenario, the index value may be transmitted in the clear or as part of the payload of a secured (e.g. encrypted) message. For example, for the various AES-GCM-based protocols (which is used in MACsec), an integrity check value (ICV) is computed in accordance with their respective algorithms using the freshness value as an input. For authentication only secured messages, the ICV is computed by the receiving device without encrypted data, and for authenticated and encrypted secured messages the ICV is computed in parallel with the encrypted data. The ICV that is obtained by processing the secured message may then be compared to a locally-derived ICV using the receiving device's stored freshness value. The use of freshness values to authenticate and/or encrypt and decrypt secured messages is generally known, and thus a further description of the use of freshness values is not provided herein for purposes of brevity.

The index values may have any suitable bit length N, which allows for the index values to be incremented a maximum number of $2^N$ times, assuming the index value is incremented by one each time it is updated. Thus, after $2^N$ secured messages have been transmitted or received over a particular secured channel, the index values risk "rolling over" or otherwise being reset to their initial default values (e.g. 0). If this occurs, there is a security risk that may be exploited with respect to replay attacks, as the same cryptographic key and index value would be used for more than a single secured message transmission. Thus, the cryptographic key that is used for secured communications expires upon the index value reaching a predetermined number and should be updated prior to this expiration. The conditions that trigger the cryptographic key being updated are further discussed below.

The key updating detector 308.2 is configured to detect when a current cryptographic key is about to expire and to transmit an indication of this to the key generator/updater 308.1, thereby triggering a cryptographic key updating process. Again, the cryptographic key that is updated as part of this process may comprise, for example, a shared key or a session key for a particular secured channel, as noted above. The key updating detector 308.2 may indicate to the key generator/updater 308.1 that a predetermined condition has been satisfied using any suitable techniques, including known techniques. For instance, the key updating detector 308.2 may write a flag to a register value that is monitored by the key generator/updater 308.1, initiate an interrupt that is recognized by the key generator/updater 308.1, etc. In any event, the key generator/updater 308.1 is configured to update the cryptographic key for a particular secured channel A, B in response to a predetermined condition being satisfied, as detected via the key updating detector 308.2.

The predetermined condition that, when satisfied, is recognized by the key updating detector 308.2 and triggers the key generator/updater 308.1 to update the cryptographic key may be any suitable condition that is relevant to the expiration of the cryptographic key that is to be updated. For example, the predetermined condition may be with respect to the index value reaching a predetermined number that is indicative of an imminent rollover that would result in an expiration of the respective cryptographic key. In this scenario, a predetermined threshold index value may be selected that, when exceeded by the index number, results in the predetermined condition being satisfied and triggers the cryptographic key to be updated. This predetermined threshold index value may be selected based upon the maximum index value count number to allow the cryptographic key to be updated in advance of its expiration. For example, the predetermined threshold index value may represent a value that is several hundred, several thousand, etc. less than the maximum index value count number. As another example, a predetermined time period may be selected independently of the index value. This predetermined time period may be compared to a total uptime of the device 300 or other suitable time period that, when exceeded, results in the predetermined condition being satisfied and triggers the cryptographic key to be updated.

In addition to updating the cryptographic key, the key generator/updater 308.1 may additionally update the index value stored in the volatile memory 312. In an embodiment, once the cryptographic key is updated for one of the secured channels A, B, the updated cryptographic key may be transmitted to the other device using the other secured channel. The updated (e.g. reset) index value may likewise be transmitted to the other device using the other secured channel.

To provide an illustrative example with respect to FIG. 3, it is assumed that the secured channel A is a bidirectional channel that operates at a lower bandwidth and speed than the unidirectional channel B. For instance, the device 300 may be identified with the device 260 as shown in FIG. 2B. Thus, the device 300 may utilize the secured channel A to perform secured bidirectional communications with the device 202. As part of these secured communications, the device 300 may transmit control data to the device 252 and receive control data from the device 252. This control data may comprise, for example, configuration data that is transmitted to the device 252, diagnostics data received from the device 252, etc. Continuing this example, the device 300 may utilize the secured channel B to transmit data unidirectionally to the device 252, which may comprise video stream data.

In this scenario, the secured channel circuitry 304, 306 each updates the index values stored for each channel in the volatile memory 312 each time a secured message is transmitted or received. But given the higher bandwidth and speed of the unidirectional secured channel B, the index value for the secured channel B will be updated at a much higher frequency compared to the index value for the secured channel A. For instance, in some scenarios the bidirectional secured channel A may be used so infrequently that the predetermined condition may not be satisfied and the cryptographic key not be updated over the entire life of the device 300.

Continuing this example, the index value for the secured channel B is updated each time secured messages are transmitted via the secured channel B. Given the higher bandwidth and speed of the secured channel B, it is assumed that at some point the predetermined condition for updating the cryptographic key will be satisfied. For example, the index value for the secured channel B may exceed a predetermined threshold index value as noted above. In this case, the key updating detector 308.2 detects this condition has been met and triggers the key generator/updater 308.1 to update the cryptographic key and the index value for the secured channel B. For example, the key generator/updater 308.1 may overwrite the shared key for channel B stored in the non-volatile memory 310 with an updated cryptographic key and update the index value for channel B stored in the volatile memory 312 with an updated index value.

Once this process has been completed, the secured channel circuitry 304 transmits the updated cryptographic key and the updated index value to the device 252 via the bidirectional secured channel A as part of a secured message. In other words, the secured channel circuitry 304 may use the shared key and the index value for the secured channel A to generate a secured message, with the contents of that secured message containing the updated cryptographic key and the updated index value for the secured channel B. The secured channel circuitry 304 may generate the secured message in any suitable manner that identifies the contents of the secured message to ensure that the device 252 recognizes the updated cryptographic key and the updated the index value. For instance, the secured message may include a field that is set to a predetermined bit value or may use any suitable encoded value to identify this specific type of secured message transmission.

The device 252 may then receive the secured message and recognize that the updated cryptographic key and the updated index value for the secured channel B are to be updated for subsequent communications. The device 252 may comprise any suitable components for this purpose, such as those shown and described herein with reference to the device 300. For example, the device 252 may store the updated cryptographic key in a corresponding non-volatile memory and store the updated index value in a corresponding volatile memory, in a similar manner as described above for the device 300 with respect to the updating process of the shared key and the index value. The secured channel circuitry 306 may then perform subsequent secured communications via the unidirectional secured channel B with the device 252 using the updated cryptographic key and the updated index value. The device 252 may also subsequently receive secured messages via the unidirectional channel B and use the updated cryptographic key and the updated index value to receive, process, decrypt, authenticate, etc. the received secured messages. In this way, the transmission of secured messages via the secured channel A may act to synchronize the index values and the cryptographic keys between the two communicating devices in a secure manner.

It is noted above that because of the lower bandwidth and speed of the bidirectional secured channel A, the predetermined condition may not be satisfied and the cryptographic key not be updated over the entire life of the device 300. However, embodiments include the use of either secured channel A, B to provide secured messages to another device that indicates that the cryptographic key and index value have been updated for the other secured channel. To provide another illustrative example, the key generator/updater 308.1 also increments the index value as secured data messages are received or transmitted via the secured channel A. The key updating detector 308.2 may implement different predetermined conditions for the secured channels A and B or the same predetermined condition, in various embodiments.

In any event, it is assumed that the predetermined conditions for the secured channel A have been met, such as the index value for channel A exceeding a predetermined threshold value, for instance. In this case, the key updating detector 308.2 detects this condition has been met and triggers the key generator/updater 308.1 to update the cryptographic key and the index value for the secured channel A. For example, the key generator/updater 308.1 may overwrite the shared key for channel A stored in the non-volatile memory 310 with an updated cryptographic key as well as updating the index value for channel A stored in the volatile memory 312 with an updated index value.

Once this process has been completed, the secured channel circuitry 304 transmits the updated cryptographic key and the updated index value to the device 252 via the unidirectional secured channel B as part of a secured message. In other words, the secured channel circuitry 306 may use the shared key and index value for the secured channel B to generate a secured message, with the contents of that secured message containing the updated cryptographic key and the updated the index value for the secured channel A. Again, the secured channel circuitry 306 may generate the secured message in any suitable manner that identifies the contents of the secured message to ensure that the device 252 recognizes the updated cryptographic key and the updated the index value, as noted above.

The device 252 may then receive the secured message via the secured channel B and recognize that the updated cryptographic key and the updated index value for the secured channel A are to be updated for subsequent communications. The devices 260, 252 may then subsequently transmit and receive secured messages via the bidirectional channel A and use the updated cryptographic key and the updated index value to transmit, encrypt, receive, process, decrypt, authenticate, etc. the transmitted and received secured messages. In this way, each secured channel communication circuitry 304, 306 may transmit secured messages indicating the updated cryptographic key and the updated index value for the other secured channel, although the secured channel communication circuitry 306 will update the cryptographic key and the index value for the unidirectional channel at a faster rate (e.g. more often) than the cryptographic key and the index value for the bidirectional channel, given the difference in their operating bandwidths as noted herein.

The use of separate secured channels A, B advantageously allows for one secured channel to be used to maintain synchronization of cryptographic keys and index values for the other channel. By using the predetermined conditions for updating the cryptographic keys and index values, this advantageously allows each secured channel to continue operating with minimal downtime as the cryptographic keys and index values are updated in advance of their expiration.

The use of physically separate secured channels may provide additional benefits. For instance, the secured channels A, B may implement different levels of security to perform their respective secured communications. As an example, the cryptographic keys implemented via the secured channel communication circuitry A and B may be the same length or different lengths than one another, in various embodiments. As one illustrative example, the shared key for one of the secured channels A, B may be longer (e.g. 256 bits) than the shared key for the other secured channel (e.g. 128 bits).

Additionally or alternatively, the use of different cryptographic key lengths may be leveraged separately or in combination with different types of secured message handling and/or cryptographic algorithms used by each of the secured channels A, B (e.g. via the secured channel circuitry 304, 306). For example, authentication only communication schemes (e.g. AUTOSAR Secure Onboard Communication (SecOC) may implement a shorter cryptographic key length compared to Authenticated Encryption with Associated Data (AEAD) communication schemes. In an embodiment, one of the secured channels A, B may utilize an AEAD communication scheme, whereas the other secured channel may implement an authentication only communication scheme. The use of these particular schemes is not limited to the type of secured channel (e.g. unidirectional or bidirectional) nor is it limited to the particular cryptographic key lengths used by each secured channel A, B. However, it may be particularly advantageous to implement a longer cryptographic key length and an AEAD communication scheme for the lower bandwidth secured channel A, and to implement a shorter cryptographic key length and an authentication only communication scheme for the higher bandwidth secured channel B.

Additionally or alternatively, the secured channels A, B may implement (e.g. via the secured channel circuitry 304, 306) different layers of security protocols to perform their respective secured communications. These different layers of security protocols may be with respect to which layer the security processing occurs. Thus, and as one example, the secured communication channel circuities 304, 306 may be configured to perform secured communications using different layers of security protocols. For example, the secured bidirectional data communications via the secured channel A may comprise communications in accordance with a first layer security protocol, whereas the secured unidirectional data communications via the secured channel B may comprise communications in accordance with a second layer security protocol. The first layer security protocol may be a higher layer security protocol or a lower security protocol than the second layer security protocol.

As an illustrative example, the first layer security protocol implemented via the bidirectional secured channel A may comprise a software layer security protocol such as an Internet Protocol Security (IPsec) security protocol. In this scenario, the secured communication channel circuitry 304 is configured to perform the secured bidirectional data communications using a software implementation. Continuing this example, the second layer security protocol implemented via the unidirectional secured channel B may comprise a hardware layer security protocol such as a Media Access Control Security (MACsec) security protocol. In this scenario, the secured communication channel circuitry 306 is configured to perform the secured unidirectional data communications using a hardware implementation.

It is noted that the previous scenario is not limiting, and either of the secured communication channel circuities 304, 306 may be configured to perform secured communications using any suitable layer of security protocol, which may be the same or different than one another. However, it may be particularly advantageous to utilize a hardware layer security protocol for higher bandwidth secured channels, such as the unidirectional secured channel B as discussed herein.

This is due to the speed advantage provided via the use of hardware layer security protocols.

Figure 4:
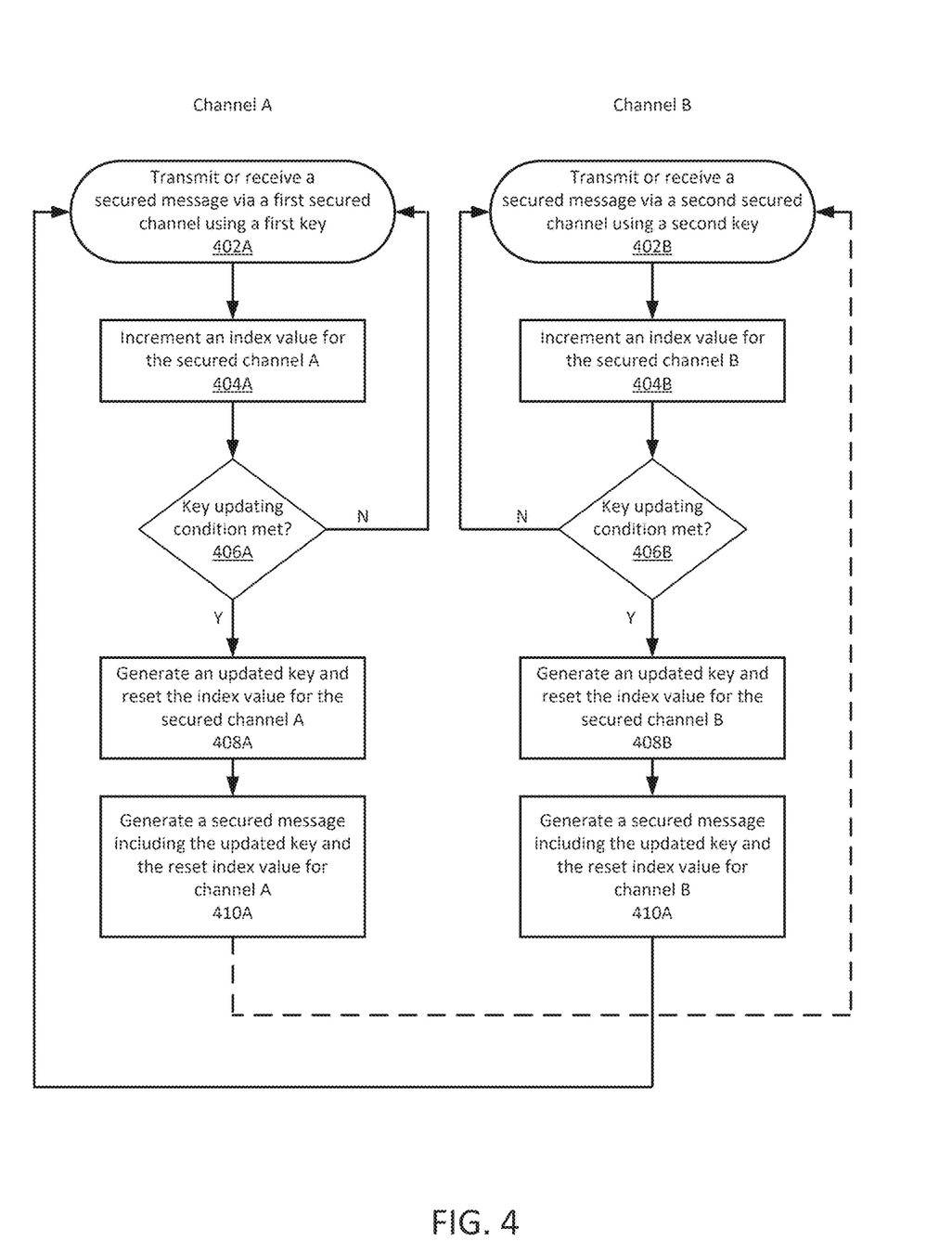
FIG. 4 illustrates an example process flow, in accordance with an embodiment of the disclosure.

FIG. 4 illustrates an example process flow, in accordance with an embodiment of the disclosure. With reference to FIG. 4, the process flow may comprise a method executed by and/or otherwise associated with any suitable number and/or type of components such as one or more processors (processing circuitry), hardware components, executed instructions (e.g., software components) or combinations of these. The components may be associated with one or more components of the device 300 as discussed herein, which again may comprise either of the devices 202, 210. The flow 400 may include alternate or additional blocks that are not shown in FIG. 4 for purposes of brevity, and may be performed in a different order than those shown. Moreover, some blocks may be optional.

FIG. 4 provides additional detail regarding the process implemented by a device to perform secured communications via two separate secured channels. The process flow 400 may be implemented via any of the devices as discussed herein, such as any of the devices 202, 210, 252, 260, 300, etc. for example, when performing a secured message communications via separate secured channels.

The process flow 400 begins with the transmission or reception of a secured message via a first channel using a first key (block 402A) and the transmission or reception of a secured message via a second secured channel using a second key (block 404B). Although the process flow 400 illustrates flows for both secured channels, this is for ease of explanation, and it is understood that communications over each secured channel A, B need not be concurrent. The first channel may be identified, for example, with the bidirectional secured channel A as shown in FIG. 3. The first key may be identified, for example, with the shared key for secured channel A or any other suitable cryptographic key as discussed herein. The second channel may be identified, for example, with the unidirectional secured channel B as shown in FIG. 3. The second key may be identified, for example, with the shared key for secured channel B or any other suitable cryptographic key as discussed herein. The secured messages may be formatted in accordance with any suitable communication protocol and include any suitable number of fields, as discussed herein. The secured messages may be transmitted and/or received, for example, as part of Authenticated Encryption with Associated Data (AEAD) communications or authentication only communications.

Upon transmitting or receiving a secured message, the process flow 400 includes incrementing (blocks 404A, 404B) an index value, which may comprise a freshness value, for example. This may include, for example, the key generator/updater 308.1 incrementing the locally stored index value per channel, as shown in FIG. 3.

The process flow 400 further comprises a determination (blocks 406A, 406B), for each secure channel, of whether a key updating condition has been satisfied. This may include, for example, any of the predetermined conditions being satisfied and detected via the key updating detector 308.2, as discussed above. As an example, this may comprise comparing the current index value to a predetermined threshold index value, as noted above. If the key updating condition is not satisfied, then the process flow 400 reverts back to blocks 402A, 402B, and additional secured messages are transmitted or received via each secured channel A, B.

However, if the key updating condition has been met, then the process flow 400 includes generating an updated cryptographic key and resetting the index value for that particular secured channel (blocks 408A, 408B). The updated cryptographic key and index value may then be stored in a suitable memory location and/or their previous values overwritten, as discussed above with respect to FIG. 3.

For each of the secured channels A, B, once the cryptographic key has been updated and the index value reset, the process flow 400 includes generating (blocks 410A, 410B) a secured message that includes the updated cryptographic key and reset index value. This may comprise adding the updated cryptographic key and reset index value to the payload of a secured message that has been encrypted with the current cryptographic key for the secured channel that is transmitting the secured message. Thus, after the secured message has been generated including the updated cryptographic key and reset index value for one of the secure channel A, B, the secured message is transmitted (blocks 402A, 402B) over the other secured channel A, B as shown in FIG. 4.

As an example, channel B may correspond to the unidirectional secured channel as shown in FIG. 3, which again may comprise a higher bandwidth and higher speed channel than the bidirectional secured channel A. Thus, the cryptographic key for the secured channel B may be updated and the index value reset prior to these same functions being performed for the secured channel A. In fact, the secured channel A may be identified with the lower bandwidth and lower speed bidirectional channel as shown in FIG. 3. As a result, the flow from the block 410A to the block 402B is optional, as the key updating condition may not be met (block 406A) over the operating lifetime of the network, as discussed above.

EXAMPLES

The techniques of this disclosure may also be described in the following examples.

Example 1. A device configured to communicate data over a set of secure channels, the device comprising: first secured channel circuitry configured to perform, via a first secured channel, secured bidirectional data communications with a further device using a first key; second secured channel circuitry configured to perform, via a second secured channel, secured unidirectional data communications with the further device using a second key; and processing circuitry configured to update the second key based upon an index value satisfying a predetermined condition, wherein the first secured channel circuitry is further configured to transmit the updated second key to the further device via the secured bidirectional channel as part of the secured bidirectional data communications, and wherein the first secured channel circuitry is configured to perform the secured unidirectional data communications with the further device using the updated second key.

Example 2. The first node of Example 1, wherein the second secured channel circuitry is configured to update the index value in response to data being transmitted or received via the secured unidirectional channel, and wherein the secured unidirectional data communications utilize the second key and the index value.

Example 3. The first node of any combination of Examples 1-2, wherein the first secured channel and the second secured channel are configured to operate at different bandwidths.

Example 4. The first node of any combination of Examples 1-3, wherein the processing circuitry is configured to update the first key based upon a further index value satisfying a further predetermined condition, and wherein the processing circuitry is configured to update the second key at a faster rate than the first key.

Example 5. The first node of any combination of Examples 1-4, wherein the secured bidirectional data communications comprise communications in accordance with a first layer security protocol, and wherein the secured unidirectional data communications comprise communications in accordance with a second layer security protocol, wherein the first layer security protocol is a higher layer security protocol than the second layer security protocol.

Example 6. The first node of any combination of Examples 1-5, wherein the first layer security protocol comprises an Internet Protocol Security (IPsec) security protocol, and wherein the second layer security protocol comprises a Media Access Control Security (MACsec) security protocol.

Example 7. The first node of any combination of Examples 1-6, wherein the first secured channel and the second secured channel are physically separated from one another between the device and the further device.

Example 8. The first node of any combination of Examples 1-7, wherein the first and the second keys comprise different key lengths.

Example 9. The first node of any combination of Examples 1-8, wherein the first secured channel circuitry is configured to perform the secured bidirectional data communications with the further device via execution of computer-readable instructions by the processing circuitry, and wherein the second secured channel circuitry is configured to perform the secured bidirectional data communications with the further device via hardware components.

Example 10. The first node any combination of Examples 1-9, wherein the secured bidirectional data communications comprises an authenticated encryption with associated data (AEAD) encryption scheme, and wherein the secured unidirectional data communications comprises an authentication only scheme.

Example 11. The first node of any combination of Examples 1-10, wherein the secured bidirectional data communications comprises an authentication only scheme, and wherein the secured unidirectional data communications comprises an authenticated encryption with associated data (AEAD) encryption scheme.

Example 12. The first node of any combination of Examples 1-11, wherein the secured bidirectional data communications and the secured unidirectional data communications transfer different types of data between the device and the further device.

Example 13. A method for communicating data over a set of secure channels, comprising: performing, via a first secured channel, secured bidirectional data communications with a device using a first key; performing, via a second secured channel, secured unidirectional data communications with the device using a second key; updating the second key based upon an index value satisfying a predetermined condition; transmitting the updated second key to the device via the secured bidirectional channel as part of the secured bidirectional data communications, and performing, via the second secured channel, the secured unidirectional data communications with the device using the updated second key.

Example 14. The first node of Example 13, further comprising: updating the index value in response to data being transmitted or received via the secured unidirectional channel, wherein the performing the secured unidirectional data communications comprises utilizing the second key and the index value.

Example 15. The first node of any combination of Examples 13-14, wherein the first secured channel and the second secured channel are configured to operate at different bandwidths.

Example 16. The first node of any combination of Examples 13-15, further comprising: updating the first key based upon a further index value satisfying a further predetermined condition, wherein updating the second key comprises updating the second key at a faster rate than the first key.

Example 17. The first node of any combination of Examples 13-16, wherein the secured bidirectional data communications comprise communications in accordance with a first layer security protocol, and wherein the secured unidirectional data communications comprise communications in accordance with a second layer security protocol.

Example 18. The first node of any combination of Examples 13-17, wherein the first layer security protocol comprises an Internet Protocol Security (IPsec) security protocol, and wherein the second layer security protocol comprises a Media Access Control Security (MACsec) security protocol.

Example 19. The first node of any combination of Examples 13-18, wherein the first secured channel and the second secured channel are physically separated from one another.

Example 20. The first node of any combination of Examples 13-19, wherein the first and the second keys comprise different key lengths.

Example 21. The first node of any combination of Examples 13-20, wherein the performing the secured bidirectional data communications comprises performing the secured bidirectional data communications using a software implementation, and wherein the performing the secured unidirectional data communications comprises performing the secured unidirectional data communications using a hardware implementation.

Example 22. The first node of any combination of Examples 13-21, wherein the performing the secured bidirectional data communications comprises communications in accordance with an authenticated encryption with associated data (AEAD) encryption scheme, and wherein the performing the secured unidirectional data communications comprises communications in accordance an authentication only scheme.

Example 23. The first node of any combination of Examples 13-22, wherein the performing the secured bidirectional data communications comprises communications in accordance with an authentication only scheme, and wherein the performing the secured unidirectional data communications comprises communications in accordance an authenticated encryption with associated data (AEAD) encryption scheme.

Example 24. The first node of any combination of Examples 13-23, wherein the secured bidirectional data communications and the secured unidirectional data communications transfer different types of data.

CONCLUSION

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation data. The term "information" may in addition to any form of digital information also include other forms of representing information. The term "entity" or "unit" may in embodiments include any device, apparatus circuits, hardware, software, firmware, chips, or other semiconductors as well as logical units or physical implementations of protocol layers etc. Furthermore, the terms "coupled" or "connected" may be interpreted in a broad sense not only covering direct but also indirect coupling.

It is further to be noted that methods disclosed in the specification or in the claims may be implemented by a device having means for performing each of the respective steps of these methods.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A device configured to communicate data over a set of secure channels, the device comprising:
   first secured channel circuitry configured to perform, via a first secured channel, secured bidirectional data communications with a further device using a first key;
   second secured channel circuitry configured to perform, via a second secured channel, secured unidirectional data communications with the further device using a second key; and
   processing circuitry configured to update the second key based upon an index value satisfying a predetermined condition,
   wherein the first secured channel circuitry is further configured to transmit the updated second key to the further device via the first secured channel as part of the secured bidirectional data communications, and
   wherein the second secured channel circuitry is configured to perform the secured unidirectional data communications with the further device using the updated second key.

2. The device of claim 1, wherein the second secured channel circuitry is configured to update the index value in response to data being transmitted or received via the second secured channel, and
   wherein the secured unidirectional data communications utilizes the second key and the index value.

3. The device of claim 1, wherein the first secured channel and the second secured channel are configured to operate at different bandwidths.

4. The device of claim 1, wherein the processing circuitry is configured to update the first key based upon a further index value satisfying a further predetermined condition, and
   wherein the processing circuitry is configured to update the second key at a faster rate than the first key.

5. The device of claim 1, wherein:
   the secured bidirectional data communications comprises communications in accordance with a first layer security protocol,
   the secured unidirectional data communications comprises communications in accordance with a second layer security protocol, and
   the first layer security protocol is a higher layer security protocol than the second layer security protocol.

6. The device of claim 5, wherein the first layer security protocol comprises an Internet Protocol Security (IPsec) security protocol, and
   wherein the second layer security protocol comprises a Media Access Control Security (MACsec) security protocol.

7. The device of claim 1, wherein the first secured channel and the second secured channel are physically separated from one another between the device and the further device.

8. The device of claim 1, wherein the first and the second keys comprise different key lengths.

9. The device of claim 1, wherein the first secured channel circuitry is configured to perform the secured bidirectional data communications with the further device via execution of computer-readable instructions by the processing circuitry, and
   wherein the second secured channel circuitry is configured to perform the secured unidirectional data communications with the further device via hardware components.

10. The device of claim 1, wherein the secured bidirectional data communications comprises an authenticated encryption with associated data (AEAD) encryption scheme, and
    wherein the secured unidirectional data communications comprises an authentication only scheme.

11. The device of claim 1, wherein the secured bidirectional data communications comprises an authentication only scheme, and
    wherein the secured unidirectional data communications comprises an authenticated encryption with associated data (AEAD) encryption scheme.

12. The device of claim 1, wherein the secured bidirectional data communications and the secured unidirectional data communications transfer different types of data between the device and the further device.

13. A method for communicating data over a set of secure channels, comprising:
    performing, via a first secured channel, secured bidirectional data communications with a device using a first key;
    performing, via a second secured channel, secured unidirectional data communications with the device using a second key;
    updating the second key based upon an index value satisfying a predetermined condition;
    transmitting the updated second key to the device via the first secured channel as part of the secured bidirectional data communications; and
    performing, via the second secured channel, the secured unidirectional data communications with the device using the updated second key.

14. The method of claim 13, further comprising:
    updating the index value in response to data being transmitted or received via the second secured channel,
    wherein the performing the secured unidirectional data communications comprises utilizing the second key and the index value.

15. The method of claim 13, wherein the first secured channel and the second secured channel are configured to operate at different bandwidths.

16. The method of claim 13, further comprising:
updating the first key based upon a further index value satisfying a further predetermined condition,
wherein updating the second key comprises updating the second key at a faster rate than the first key.

17. The method of claim 13, wherein the secured bidirectional data communications comprises communications in accordance with a first layer security protocol, and
wherein the secured unidirectional data communications comprises communications in accordance with a second layer security protocol.

18. The method of claim 17, wherein the first layer security protocol comprises an Internet Protocol Security (IPsec) security protocol, and
wherein the second layer security protocol comprises a Media Access Control Security (MACsec) security protocol.

19. The method of claim 13, wherein the first secured channel and the second secured channel are physically separated from one another.

20. The method of claim 13, wherein the first and the second keys comprise different key lengths.

21. The method of claim 13, wherein the performing the secured bidirectional data communications comprises performing the secured bidirectional data communications using a software implementation, and
wherein the performing the secured unidirectional data communications comprises performing the secured unidirectional data communications using a hardware implementation.

22. The method of claim 13, wherein the performing the secured bidirectional data communications comprises communications in accordance with an authenticated encryption with associated data (AEAD) encryption scheme, and
wherein the performing the secured unidirectional data communications comprises communications in accordance with an authentication only scheme.

23. The method of claim 13, wherein the performing the secured bidirectional data communications comprises communications in accordance with an authentication only scheme, and
wherein the performing the secured unidirectional data communications comprises communications in accordance with an authenticated encryption with associated data (AEAD) encryption scheme.

24. The method of claim 13, wherein the secured bidirectional data communications and the secured unidirectional data communications transfer different types of data.

* * * * *